Jan. 10, 1961 E. A. ZACKHEIM ET AL 2,967,651
FLOSS FONT
Filed March 1, 1955
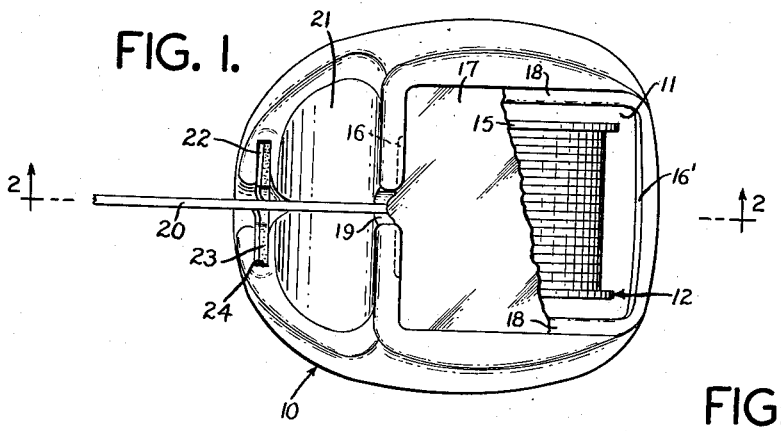
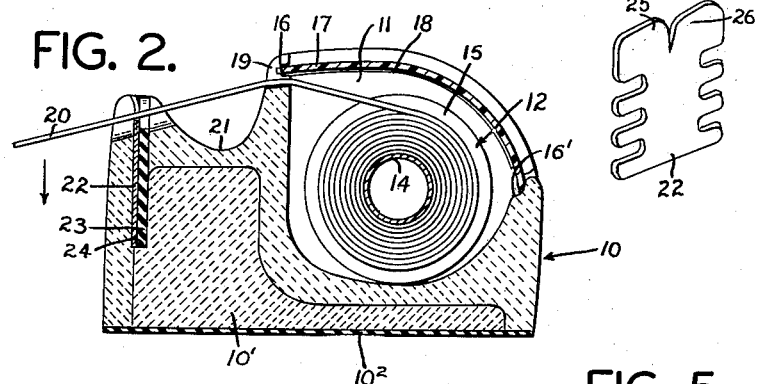
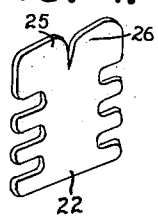
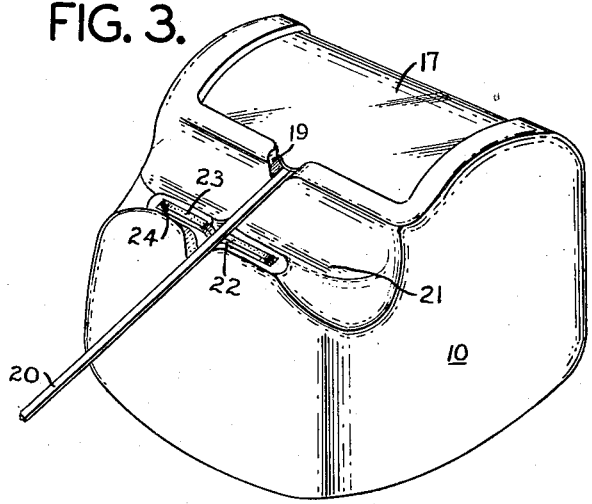
INVENTORS
ELI A. ZACKHEIM
ARTHUR R. MEARES
JOSEPH F. HANLON
BY
ATTORNEY

United States Patent Office 2,967,651
Patented Jan. 10, 1961

2,967,651
FLOSS FONT

Eli A. Zackheim, South Plainfield, Arthur R. Meares, Westfield, and Joseph F. Hanlon, Middlesex, N.J., assignors to Johnson & Johnson, a corporation of New Jersey Filed Mar. 1, 1955, Ser. No. 491,454

4 Claims. (Cl. 225—80)

This invention relates to fonts or dispensers for dental floss or other material having the form of a cord or tape and supplied in rolls.

The general object of this invention is to provide an improved floss font equipped with cutter, which is simple and inexpensive, sanitary, reliable in action, simple to reload and safe to use.

A font embodying the invention in a preferred form will first be described with reference to the accompanying drawing and the features forming the invention will then be pointed out in the appended claims.

In the drawing:

Fig. 1 is a plan view of the font;

Fig. 2 is a section on the line 2—2 of Fig. 1;

Fig. 3 is an isometric view; and

Figs. 4 and 5 are detail perspectives.

The font comprises a unitary cast or molded body 10, preferably ceramic for sanitary reasons, having a cavity 11 which holds a roll or spool 12 of dental floss. The roll or spool may be of any convenient form, with or without central core or flange elements, but is shown for definiteness of disclosure as comprising a spool core 14 and end flanges 15. The manner of support of the spool is not critical and it may be supported in any convenient manner by means of its core or periphery. In particular, the spool may simply sit in the cavity 11, being supported by its flanges 15. It will be apparent that the device is useable with spools having a considerable variation in size, shape and construction, it being necessary merely that the spool be received in the cavity 11 with sufficient clearance to permit its rotation as the floss is pulled off it. The body 10 is formed with a slot or groove 16 to receive an end of a translucent cover 17 which is arched or bent, as shown, and supported by ledges 18 at each side and a ledge 16' at the other end. The cover 17 may be formed of any suitable material having the required springiness and flexibility to permit it to be bent into the form shown and, when so bent, to press its ends solidly into the groove 16 and against the ledge 16'. The cover 17 may be transparent or opaque if desired, but a translucent cover is preferred from the standpoint of appearance and permitting inspection of the spool without removal of the cover.

An opening or notch 19 accommodates the dental floss end 20. As will be noted, the cover 17 is formed with a projecting tongue portion which enters into the notch 19, thus centering the cover in a positive manner and providing maximum protection for the font against dust. Beyond the notch 19 the body 10 is depressed, as at 21, and beyond the depression it carries a cutter in the form of a blade 22 and a snubber or gripper 23 which are held in a slot 24 formed in the body 10. Blade 22 is stamped into the form shown in Fig. 4, its upper edge being cut and bent to form tongues 25 and 26 which are bent oppositely out of the plane of the blade 22, as shown. The upper ends of tongues 25, 26 are rounded, as shown, to form a notch for guiding the floss end into the slit or cut between the tongues. The snubber or gripper 23 is also cut, as at 27, in alignment or registry with the cut in the upper portion of blade 22. The snubber or gripper 23 may be formed of rubber, plastic, leather, fiber or any other suitable material capable of frictionally gripping the floss end in the slit 27. It serves the purpose of holding the floss end so as to prevent its being withdrawn into the cavity 11 in the event of the spool 12 overrunning and, hence, constitutes an anti-backlash device. It also holds the floss end against similar withdrawal into the cavity 11 due to accidental rotation of the spool due to its inertia and while the floss font is being handled. The end is thus held in a definite position and is readily picked up by the fingers due to the depression 21, which permits gripping the floss with the fingers without having to pick it up off a surface upon which it is resting.

The elements 22, 23 may be joined together adhesively or otherwise and fixed in the groove or slot 24 in any convenient manner. In the construction shown, the edges of the elements 22, 23 are serrated or notched, and are held in place by plaster 10' with which the bottom of the member 10 is filled. The material 10' serves to weight the font and at the same time holds the elements 22, 23 solidly in position. They are positioned vertically in a positive manner with their shoulder upon which the lower edge of the blade member 22 sits, as shown, and by a further shoulder formed in the pouring of the material 10' into the bottom of the body 10. A rubber, felt or other bottom covering is applied to the font, to prevent scratching or denting of any surface upon which it may be put, as well as chipping of the ceramic body 10. Where made of rubber or other similar frictional material, the bottom covering $10^2$ also serves as a non-skid pad to prevent skidding of the font on any surface on which it is placed.

The floss end is cut by pulling it downwardly between the tongues 25, 26 and the blade member 22. These tongues being in contact with each other or substantially so, provide an ideal cutting or shearing action, as the floss is drawn downwardly and wedged between them. The cutter has been found to operate thousands of times in succession without failure or evidence of wear and without tendency to split or scrape the floss objectionably as is common with many cutters.

It will be noted that no frictional resistance is offered to the unreeling of the floss through opening 19, and no such resistance is ordinarily required. In measuring off the desired length, the floss spanning the depression 21 is picked up, freeing the cut end from the snubber 23, and the required length is drawn out. When the required length has been thus pulled out, it is pulled downward, cutting it off in the cutter slit as described above. The spool shows no tendency toward objectional overrunning or "backlash" since the snubber 23 offers sufficient resistance to prevent the end of the floss from being pulled out of the cutter and back through slot 19, thereby making it necessary to rethread the floss.

What is claimed is:

1. In a dental floss dispenser, a cutting device comprising a blade, a snubber of resilient material and means holding the blade and snubber closely adjacent to each other, the said blade and snubber having slit upper edges with the slits in registry, the edges of the slits being normally substantially in contact, whereby movement of the floss down the blade slit severs the floss and the snubber grips and holds a floss end in the slit therein.

2. A dental floss dispenser according to claim 1, comprising also a unitary ceramic body member having a hollow bottom and filler material cast therein, the said ceramic body member having a slot in which the blade and snubber fit and which constitutes the said means for holding the blade and snubber closely adjacent to each other, the said slot communicating with the said hollow bottom and the said blade and snubber having apertures occupied by the said filler material for holding them in position in the slot.

3. A dental floss dispenser comprising a unitary ceramic body member having a cavity for holding a spool of floss in its upper portion and a slot for holding a cutting device, the lower portion of the body member being hollow and generally following the upper contour thereof, and the lower part of the slot being open so as to communicate with the hollow lower part of the body member, a cutting device fitting in the said slot, and cast material filling the lower portion of the body member and holding the cutting device in the said slot.

4. A dental floss dispenser according to claim 3, in which the slot has a shoulder supporting the lower end of the cutting device.

References Cited in the file of this patent

UNITED STATES PATENTS

| | | |
|---|---|---|
| 459,283 | Grigsby | Sept. 8, 1891 |
| 549,387 | O'Leary | Nov. 5, 1895 |
| 1,608,344 | Simmons | Nov. 23, 1926 |
| 1,981,388 | Perry | Nov. 20, 1934 |
| 2,305,592 | Anderson | Dec. 22, 1942 |
| 2,370,699 | Warren | Mar. 6, 1945 |
| 2,488,492 | Dumbleton | Nov. 15, 1949 |
| 2,708,076 | Polster et al. | May 10, 1955 |

FOREIGN PATENTS

| | | |
|---|---|---|
| 13,531 | Great Britain | of 1895 |
| 411,617 | Great Britain | June 14, 1934 |